(12) United States Patent
Boic

(10) Patent No.: US 10,750,211 B2
(45) Date of Patent: Aug. 18, 2020

(54) VIDEO-SEGMENT IDENTIFICATION SYSTEMS AND METHODS

(71) Applicant: RealNetworks, Inc., Seattle, WA (US)

(72) Inventor: Milko Boic, Sammamish, WA (US)

(73) Assignee: REALNETWORKS, INC., Seattle, WA (US)

(*) Notice: Subject to any disclaimer, the term of this patent is extended or adjusted under 35 U.S.C. 154(b) by 0 days.

(21) Appl. No.: 16/267,097

(22) Filed: Feb. 4, 2019

(65) Prior Publication Data

US 2019/0238904 A1 Aug. 1, 2019

Related U.S. Application Data

(63) Continuation of application No. 14/449,540, filed on Aug. 1, 2014, now Pat. No. 10,225,583.

(51) Int. Cl.
| | |
|---|---|
| *H04N 21/234* | (2011.01) |
| *G11B 27/031* | (2006.01) |
| *G11B 27/28* | (2006.01) |
| *H04N 21/845* | (2011.01) |
| *H04N 21/8549* | (2011.01) |

(52) U.S. Cl.
CPC ..... *H04N 21/23406* (2013.01); *G11B 27/031* (2013.01); *G11B 27/28* (2013.01); *H04N 21/23418* (2013.01); *H04N 21/8456* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 6,002,443 A | 12/1999 | Iggulden | |
| 7,269,330 B1 | 9/2007 | Iggulden | |
| 7,620,293 B2 | 11/2009 | Noh et al. | |
| 2002/0110358 A1* | 8/2002 | Green | G11B 27/28 386/329 |
| 2007/0036518 A1 | 2/2007 | Jeong et al. | |
| 2010/0054333 A1 | 3/2010 | Bing et al. | |
| 2012/0076357 A1 | 3/2012 | Yamamoto et al. | |
| 2012/0082431 A1* | 4/2012 | Sengupta | H04N 5/772 386/241 |
| 2013/0182767 A1 | 7/2013 | Xie et al. | |
| 2013/0279881 A1 | 10/2013 | Lu et al. | |

FOREIGN PATENT DOCUMENTS

KR 10-0543453 B1 1/2006

OTHER PUBLICATIONS

Brandt et al., "Fast Frame-Based Scene Change Detection in the Compressed Domain for MPEG-4 Video," 2$^{nd}$ *International Conference on Next Generation Mobile Applications, Services and Technologies*, Cardiff, United Kingdom, Sep. 16-19, 2008, 7 pages.

(Continued)

*Primary Examiner* — Edemio Navas, Jr.
(74) *Attorney, Agent, or Firm* — Seed IP Law Group LLP

(57) ABSTRACT

Summarization segments of an encoded video can be efficiently identified, without the need to decode the encoded video to obtain image data, by analyzing encoded-buffer-size deltas, each indicating an encoded-buffer-size difference between a pair of intra-coded frames of an encoded video.

20 Claims, 6 Drawing Sheets

(56) References Cited

OTHER PUBLICATIONS

Li et al., "An Effective and Fast Scene Change Detection Algorithm for MPEG Compressed Videos," $3^{rd}$ *International Conference on Image Analysis and Recognition*, Póvoa de Varzim, Portugal, Sep. 18-20, 2006, pp. 206-214.

Ren et al., "Activity-driven content adaptation for effective video summarization," *Journal of Visual Communication and Image Representation* 21(8):930-938, 2010.

\* cited by examiner

VIDEO-SEGMENT IDENTIFICATION SYSTEMS AND METHODS

FIELD

This disclosure is directed to the field of software, and more particularly to efficiently identifying summarization segments of an encoded video without the need to decode the encoded video to obtain image data.

BACKGROUND

Camera phones and other personal digital-video capture devices have become nearly ubiquitous in the early 21st century. As a result, many individuals and entities have acquired sizable libraries of digital video footage, much of it recorded during vacations, parties, or other events.

However, while it is very easy to record video footage, editing and curating one's digital-video library can be a tedious, difficult, and time-consuming chore. Consequently, several approaches to automatic video indexing and segmentation have been developed. Some of these approaches operate on decoded or decompressed image data, detecting scene changes by inspecting pixel values of frames of video. However, most digital video is stored in encoded or compressed format, and decoding compressed video to obtain image data is a relatively computationally expensive operation.

Other approaches operate on encoded or compressed video, analyzing information that is accessible without decoding the video, such as discrete cosine transform ("DCT") values and motion vectors of successive interframes of encoded video.

However, existing approaches tend to be complex and may not scale well. Furthermore, existing approaches that merely identify scene changes within a video do not necessarily provide information about which of the identified scenes may be comparatively interesting to a human observer.

DESCRIPTION

Figure 1:
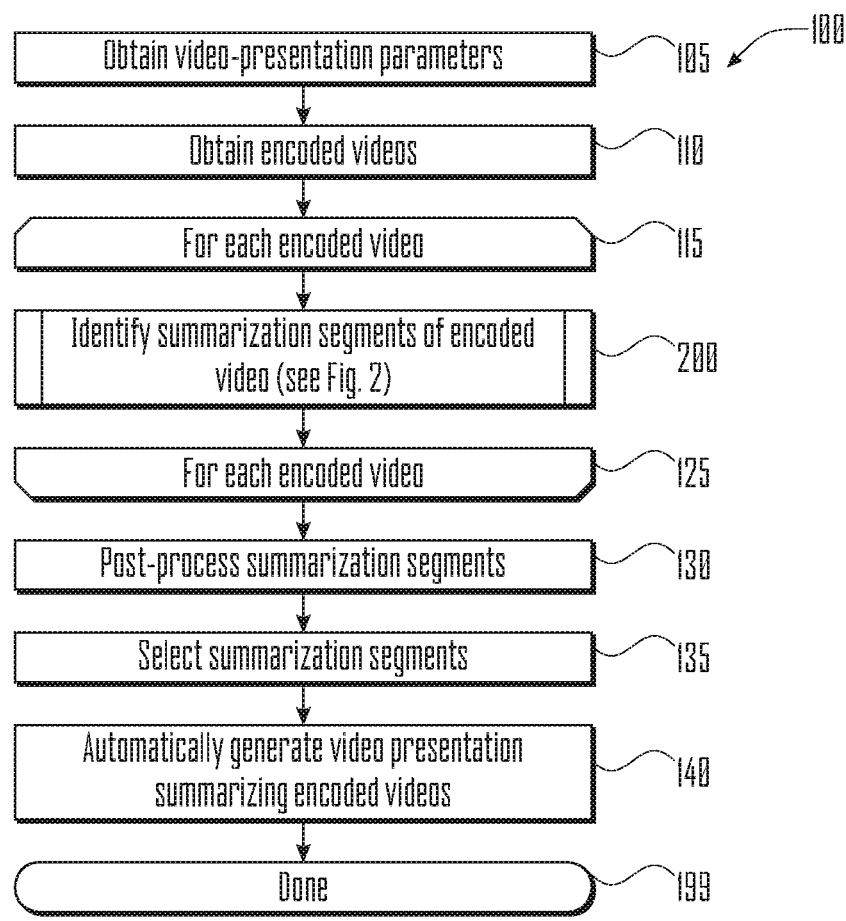
FIG. 1 illustrates a routine for automatically generating a video presentation summarizing one or more encoded videos, such as may be performed by a video-segment identification device in accordance with one embodiment.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Various embodiments, as discussed below, may efficiently detect temporal segments of compressed video that stand out as interesting or significant for human viewing by leveraging analysis performed by video compression algorithms at the time of compression.

Most video-compression algorithms pursue maximum compression while preserving quality and are sensitive to image complexity and to changes in the image over time. The results of the video-compression algorithm's effort are encapsulated in a number of properties of compressed video that can be readily extracted without uncompressing the data, and that can be efficiently analyzed as signals to identify and score temporal segments of video for their visual complexity and motion. Furthermore, such signals, individually or in combination, can be used to identify segments in video that statistically are likely to be of interest to a human observer.

As discussed below, one property of compressed video that can be easily extracted to form signals (time mapped values) is the encoded-buffer size or storage size of intra-frame coded images (also referred to as I-frames or keyframes) that can be decoded independently of any other frames.

Generally, the process of efficiently detecting interesting segments of a compressed video may follow a broad outline similar to the following.

- generating time-domain signal for each property (or combination of properties) that is readily available from the compressed video data (without decompressing the data);
- finding patterns in the time-domain signals to detect temporal start and end points of a potentially interesting segment;
- scoring the potentially interesting segments based on signal characteristics such as signal strength, signal variability, signal rise, signal decline either within and/or surrounding the identified segment;
- when multiple videos are analyzed, normalizing the segment scores based on characteristic strength of the signals generated with each video (e.g. using average or RMS method); and
- selecting, coalescing, cutting, temporally stretching and/ or compacting high scoring segments based on factors such as the overall presentation duration, desired individual segment duration, temporal segment separation, or other goal characteristics of the final presentation.

More particularly, as discussed herein, in various embodiments, a processor and/or processing device may be configured (e.g., via non-transitory computer-readable storage media) to perform a first method for efficiently identifying summarization segments of an encoded video without the need to decode the encoded video to obtain image data, the first method including steps similar to some or all of the following: identifying sequenced intra-coded frames of the encoded video; determining encoded-buffer sizes corresponding respectively to the sequenced intra-coded frames; and selecting summarization segments of the encoded video based at least in part on encoded-buffer-size deltas, each indicating an encoded-buffer-size difference between a pair of intra-coded frames of the sequenced intra-coded frames.

In some embodiments, the first method further includes steps similar to some or all of the following: automatically generating a video presentation summarizing the encoded video, the video presentation including the summarization segments.

In some embodiments, the first method further includes steps similar to some or all of the following: obtaining second summarization segments selected from a second encoded video; scoring the summarization segments and the second summarization segments according to a metric associated with encoded-buffer-size deltas; selecting a first subset of the summarization segments and a second subset of the second summarization segments; and automatically generating a video presentation summarizing the encoded video and the second encoded video, the video presentation including the first selected subset and the second selected subset.

In some embodiments, selecting the summarization segments includes steps similar to some or all of the following: determining that an encoded-buffer-size delta of the encoded-buffer-size deltas exceeds a segment-start threshold; and determining that one of the summarization segments starts at a timestamp associated with the determined encoded-buffer-size delta.

In some embodiments, determining that the determined encoded-buffer-size delta exceeds the segment-start threshold includes steps similar to some or all of the following: selecting a target intra-coded frame; determining a time-window immediately preceding the target intra-coded frame, the time-window including preceding intra-coded frames; selecting a preceding intra-coded frame within the time-window as having a small encoded-buffer size among the preceding intra-coded frames; and determining an encoded-buffer-size delta corresponding to the target intra-coded frame and the preceding intra-coded frame.

In some embodiments, determining that the determined encoded-buffer-size delta exceeds the segment-start threshold includes steps similar to some or all of the following: selecting a target intra-coded frame; determining a time-window immediately preceding the target intra-coded frame, the time-window including preceding intra-coded frames; selecting a preceding intra-coded frame within the time-window as having a large encoded-buffer size among the preceding intra-coded frames; and determining an encoded-buffer-size delta corresponding to the preceding intra-coded frame and the target intra-coded frame.

In some embodiments, selecting the summarization segments includes steps similar to some or all of the following: determining that an encoded-buffer-size delta of the encoded-buffer-size deltas exceeds a segment-end threshold; and determining that one of the summarization segments ends at a timestamp associated with the determined encoded-buffer-size delta.

In some embodiments, selecting the summarization segments includes steps similar to some or all of the following: ensuring that the summarization segments are separated by at least a minimum time-gap.

In some embodiments, selecting the summarization segments includes steps similar to some or all of the following: ensuring that each of the summarization segments are at least a minimum duration in length.

Described more fully below are many additional details, variations, and embodiments that may or may not include some or all of the steps, features, and/or functionality described above.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a routine 100 for automatically generating a video presentation summarizing one or more encoded videos, such as may be performed by a video-segment identification device 600 in accordance with one embodiment.

In various embodiments, routine 100 may be performed by a video-capture device such as a smart phone and/or tablet computer to generate a video presentation summarizing one or more encoded videos captured by the video-capture device. In other embodiments, routine 100 may be performed by a personal computer operated by an individual to generate a video presentation summarizing one or more encoded videos captured by the individual using a personal video-capture device. In still other embodiment, routine 100 may be performed by a computing device operated by an individual or entity providing (among other things) automatic encoded video-summarization services for encoded videos captured by others and provided to the computing device for summarization.

In block 105, routine 100 obtains one or more video-presentation parameters, such as an overall presentation duration, desired individual segment duration, temporal segment separation, or other goal characteristics.

In block 110, routine 100 obtains one or more encoded videos. As the term is used herein, an "encoded" video refers to video data that has been encoded or compressed according to a lossy video compressor, such as a video compressor that conforms to a lossy video coding/compression format, such as MPEG-2 Part 2, MPEG-4 Part 2, H.264 (MPEG-4 Part 10), HEVC, Theora, Dirac, RealVideo RV40, VP8, VP9, and the like, that uses a combination of interframe and intraframe compression techniques.

Beginning in opening loop block 115, routine 100 processes each encoded video obtained in block 110 in turn.

In subroutine block 200, routine 100 calls subroutine 200 (see FIG. 2, discussed below) to efficiently identify summarization segments of an encoded video without the need to decode the encoded video to obtain image data. As the term is used herein, "image data" refers in this context to decoded/decompressed data representing values in the spatial/2D/pixel domain of one or more images/frames from a video.

In ending loop block 125, routine 100 iterates back to opening loop block 115 to process the next encoded video obtained in block 110, if any.

In block 130, routine 100 post-processes the summarization segments, typically based at least in part on one or more video-presentation parameters obtained in block 105 and/or on summarization-segment scores such as may be determined in block 230 (see FIG. 2, discussed below).

In some embodiments, routine 100 ensures that a plurality of summarization segments are separated by at least a minimum time-gap and/or that each of the plurality of summarization segments are at least a minimum duration in length. In some embodiments, routine 100 may select, coalesce, cut, stretch, and/or compact high scoring segments consistent with video-presentation parameters obtained in block 105.

In block 135, routine 100 selects some or all of the summarization segments based at least in part on the evaluations performed in block 230 and on video-presentation parameters obtained in block 105.

In block 140, routine 100 automatically generates a video presentation summarizing the encoded videos obtained in block 110, the video presentation including some or all of the summarization segments identified in iterations of subroutine block 200.

Routine 100 ends in ending block 199.

Figure 2:
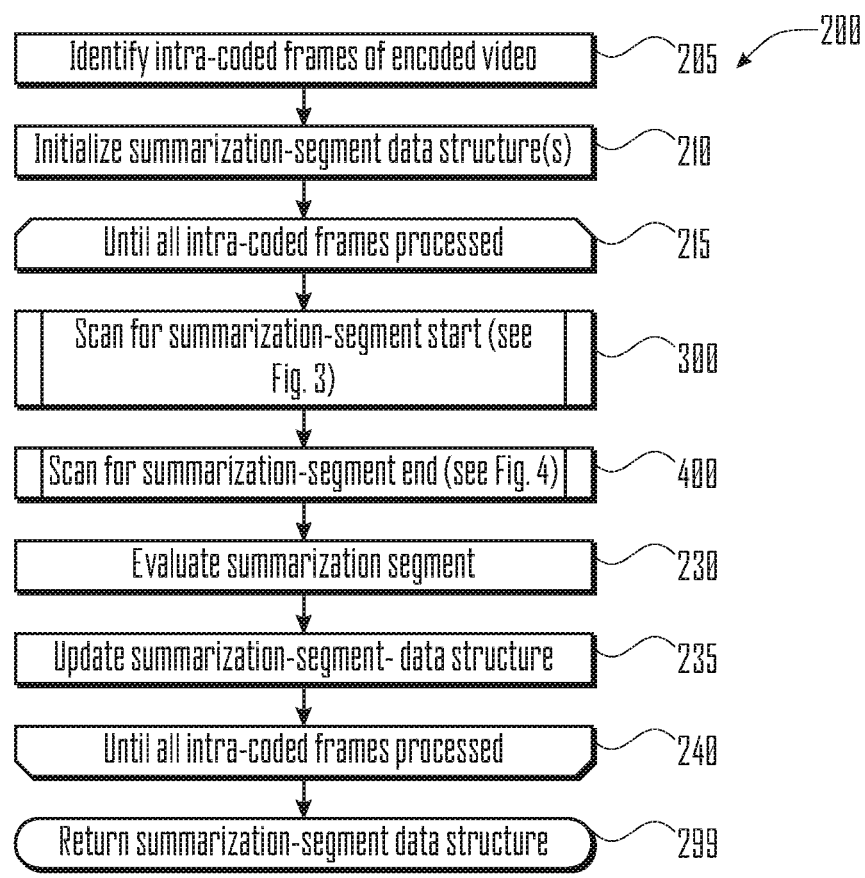
FIG. 2 illustrates a subroutine for efficiently identifying summarization segments of a given encoded video without the need to decode the given encoded video to obtain image data, such as may be performed by a video-segment identification device in accordance with one embodiment.

FIG. 2 illustrates a subroutine 200 for efficiently identifying summarization segments of a given encoded video without the need to decode the given encoded video to obtain image data, such as may be performed by a video-segment identification device 600 in accordance with one embodiment.

In block 205, subroutine 200 identifies a sequenced plurality of intra-coded frames of the given encoded video. As the term is used herein, a "intra-coded frame" refers to a frame of the given video that is coded/compressed without reference to macroblocks or similar data from another frame. Intra-coded frames are sometimes called "I-frames" or "key-frames" and are distinguished from "P-frames", "B-frames" and other interframe-coded pictures that are coded/compressed (at least in part) by reference to another frame of the video. In some encoded videos, intra-coded frames appear at regular intervals, e.g. one intra-coded frame every 'N' seconds or every 'M' frames. In other encoded videos, intra-coded frames appear at irregular intervals.

In block 210, subroutine 200 initialize summarization-segment data structure(s) initializes one or more data structures representing summarization segments of the given encoded video.

Beginning in opening loop block 215, subroutine 200 processes each all intra-coded frames processed in turn.

In subroutine block 300, subroutine 200 calls subroutine 300 (see FIG. 3, discussed below) to scan for summarization-segment start scan through the remaining intra-coded frames until one is found that satisfies one or more conditions indicative of the start of a summarization segment.

In subroutine block 400, subroutine 200 calls subroutine 400 (see FIG. 4, discussed below) to scan for summarization-segment end scan through the remaining intra-coded frames until one is found that satisfies one or more conditions indicative of the end of a summarization segment.

In block 230, subroutine 200 evaluates the summarization segment evaluates the summarization segment bounded by the segment start identified in subroutine block 300 and the segment end identified in subroutine block 400. In various embodiments, subroutine 200 may evaluate the summarization segment according to various factors, such as the length of the summarization segment, the rate of change in encoded-buffer sizes preceding and/or following the summarization segment, and the like. Summarization segment candidates graph 520 (see FIG. 5, discussed below) illustrates an exemplary set of evaluation values of summarization segments.

In block 235, subroutine 200 updates the summarization-segment-data structure according to the segment start identified in subroutine block 300, the segment end identified in subroutine block 400, and the evaluation performed in block 230.

In ending loop block 240, subroutine 200 iterates back to opening loop block 215 to process the next all intra-coded frames processed, if any.

Subroutine 200 ends in ending block 299, returning the summarization-segment data structure to the caller.

Figure 3:
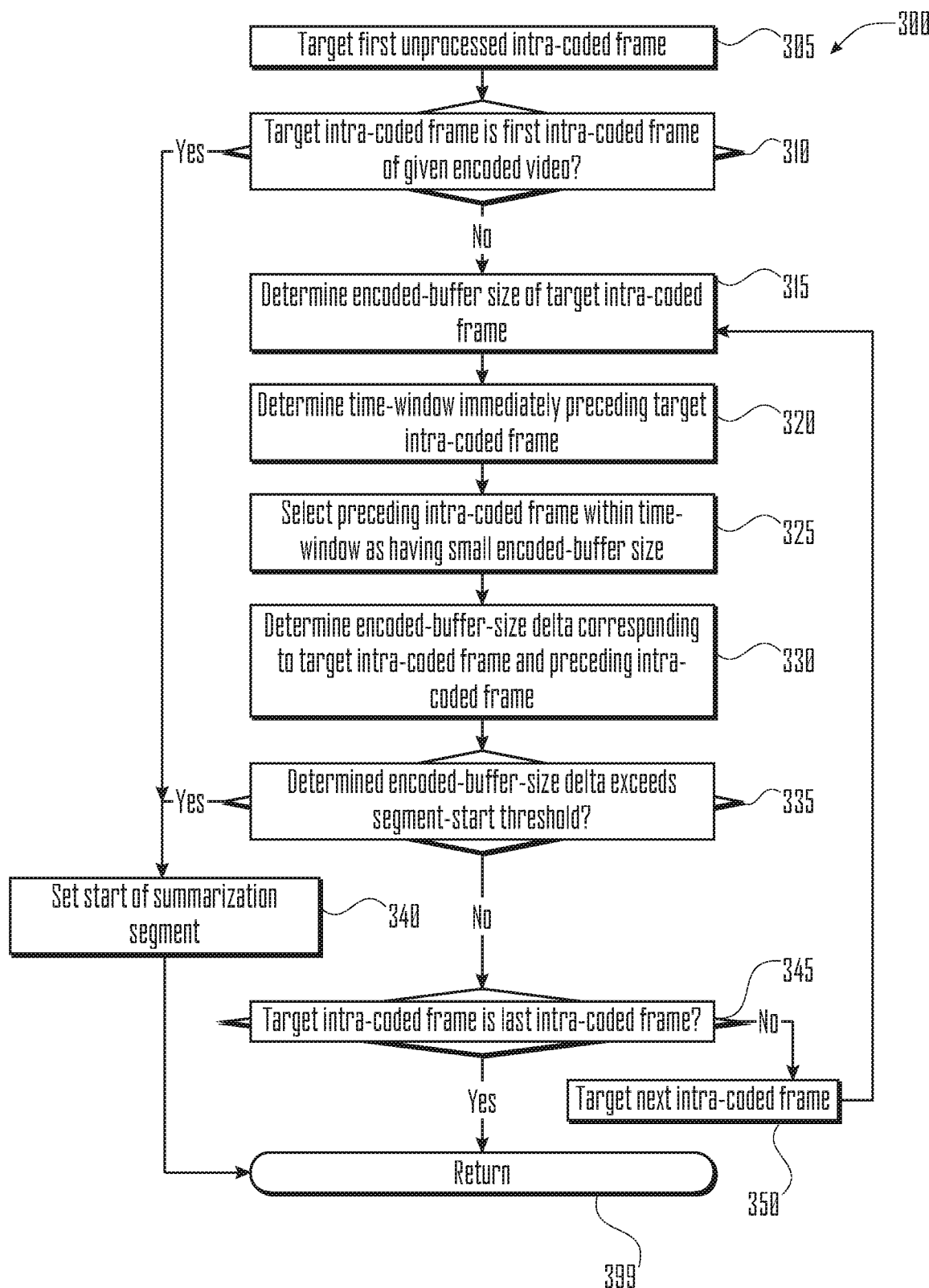
FIG. 3 illustrates a subroutine for identifying a beginning of a summarization segment of a given encoded video based at least in part on a plurality of encoded-buffer-size deltas, each indicating an encoded-buffer-size difference between a pair of intra-coded frames of a sequenced plurality of intra-coded frames, such as may be performed by a video-segment identification device in accordance with one embodiment.

FIG. 3 illustrates a subroutine 300 for identifying a beginning of a summarization segment of a given encoded video based at least in part on a plurality of encoded-buffer-size deltas, each indicating an encoded-buffer-size difference between a pair of intra-coded frames of a sequenced plurality of intra-coded frames, such as may be performed by a video-segment identification device 600 in accordance with one embodiment.

In block 305, subroutine 300 selects the first intra-coded frame of the given encoded video that has not already been processed.

In decision block 310, subroutine 300 determines whether target intra-coded frame selected in block 305 is the first intra-coded frame of the given encoded video.

In block 315, subroutine 300 determines the encoded-buffer size of the target intra-coded frame selected in block 305. The encoded-buffer size of the target intra-coded frame is available without decoding the given encoded video (which is computationally expensive) and represents the quantity of data that the lossy encoder allocated to the target intra-coded frame. Encoded-buffer sizes graph 505 (see FIG. 5, discussed below) illustrates a signal derived from the encoded-buffer sizes of intra-coded frames within an exemplary encoded video.

In block 320, subroutine 300 determines a time-window immediately preceding the target intra-coded frame, the time-window including a plurality of preceding intra-coded frames. In some embodiments, the time-window has a predetermined duration of, for example, between 1-5 seconds. In the exemplary implementation described in Appendix A, the immediately-preceding time-window has a duration of 3.5 seconds.

In block 325, subroutine 300 selects the preceding intra-coded frame within a time-window as having a small encoded-buffer size among a plurality of preceding intra-coded frames.

In block 330, subroutine 300 determines an encoded-buffer-size delta corresponding to the target intra-coded frame and the preceding intra-coded frame. Start encoded-buffer-size deltas graph 510 (see FIG. 5, discussed below) illustrates an exemplary signal derived from encoded-buffer-size deltas determined based on the preceding intra-coded frame within a time-window as having a small encoded-buffer size.

In decision block 335, subroutine 300 determines whether the determined encoded-buffer-size delta exceeds a predetermined segment-start threshold. If so, then subroutine 300 proceeds to block 340. Otherwise, subroutine 300 proceeds to decision block 345.

In some embodiments, the segment-start threshold may be expressed as a percentage of the range between the largest and the smallest encoded-buffer size within the given encoded video. In the exemplary implementation described in Appendix A, the segment-start threshold is determined to be 8% of the encoded-buffer-size range within the encoded video.

In block 340, subroutine 300 determines that one of a plurality of summarization segments starts at a timestamp associated with an encoded-buffer-size delta.

In decision block 345, subroutine 300 determines whether the target intra-coded frame is the last intra-coded frame of the given encoded video. If so, then subroutine 300 proceeds to ending block 399. Otherwise, subroutine 300 proceeds to block 350.

In block 350, subroutine 300 target next intra-coded frame.

Subroutine 300 ends in ending block 399, returning to the caller.

Figure 4:
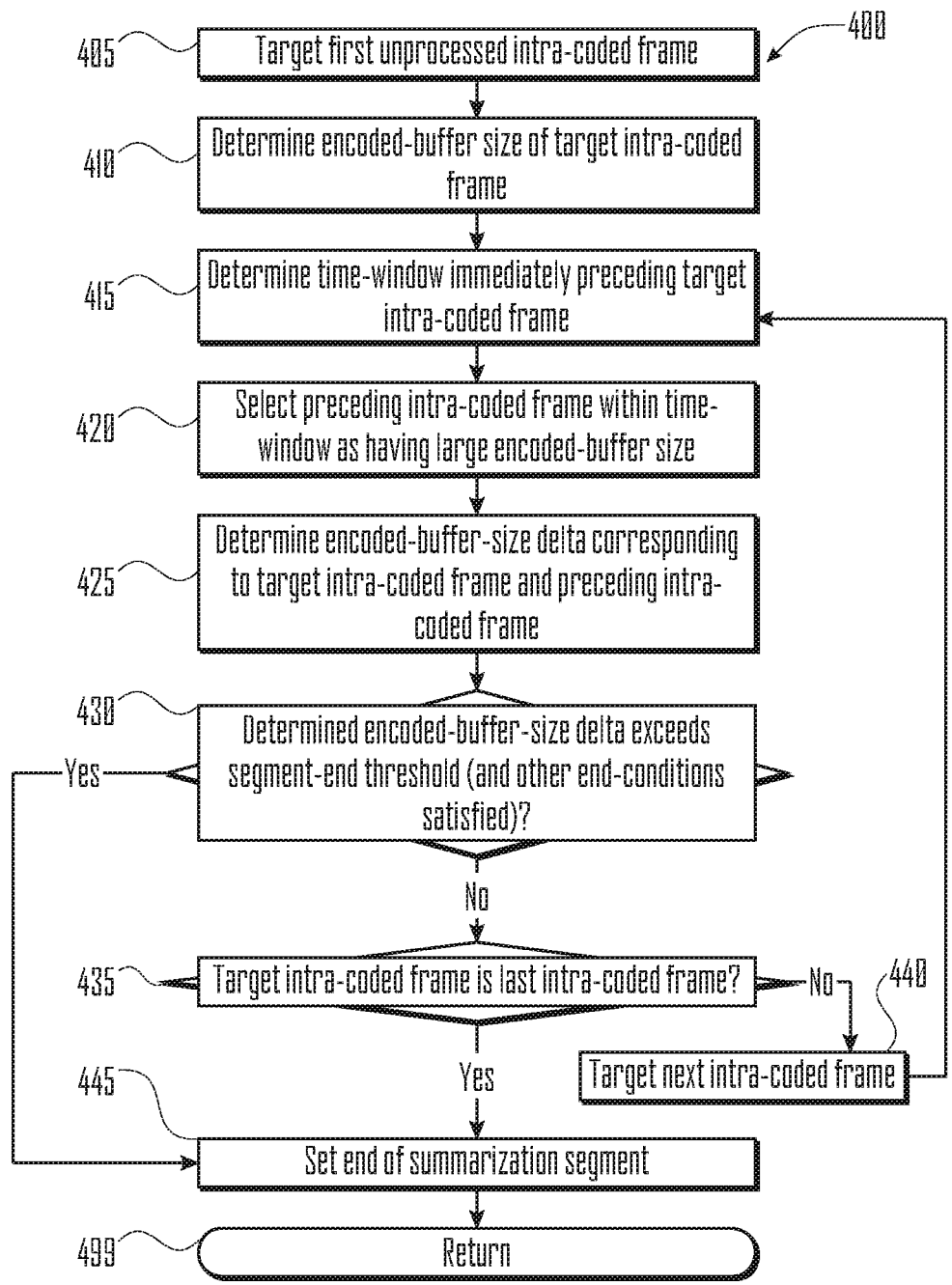
FIG. 4 illustrates a subroutine for identifying an ending of a summarization segment of a given encoded video based at least in part on a plurality of encoded-buffer-size deltas, each indicating an encoded-buffer-size difference between a pair of intra-coded frames of a sequenced plurality of intra-coded frames, such as may be performed by a video-segment identification device in accordance with one embodiment.

FIG. 4 illustrates a subroutine 400 for identifying an ending of a summarization segment of a given encoded video based at least in part on a plurality of encoded-buffer-size deltas, each indicating an encoded-buffer-size difference between a pair of intra-coded frames of a sequenced plurality of intra-coded frames, such as may be performed by a video-segment identification device 600 in accordance with one embodiment.

In block 405, subroutine 400 selects the first intra-coded frame of the given encoded video that has not already been processed.

In block 410, subroutine 400 determines the encoded-buffer size of the target intra-coded frame selected in block 405. The encoded-buffer size of the target intra-coded frame is available without decoding the given encoded video (which is computationally expensive) and represents the quantity of data that the lossy encoder allocated to the target intra-coded frame. Encoded-buffer sizes graph 505 (see FIG. 5, discussed below) illustrates a signal derived from the encoded-buffer sizes of intra-coded frames within an exemplary encoded video.

In block 415, subroutine 400 determines a time-window immediately preceding the target intra-coded frame, the time-window including a plurality of preceding intra-coded frames. In some embodiments, the time-window has a predetermined duration of, for example, between 1-5 seconds. In the exemplary implementation described in Appendix A, the immediately-preceding time-window has a duration of 3.5 seconds.

In block 420, subroutine 400 selects the preceding intra-coded frame within a time-window as having a large encoded-buffer size among a plurality of preceding intra-coded frames.

In block 425, subroutine 400 determines an encoded-buffer-size delta corresponding to the target intra-coded frame and the preceding intra-coded frame. Start encoded-buffer-size deltas graph 510 (see FIG. 5, discussed below) illustrates an exemplary signal derived from encoded-buffer-size deltas determined based on the preceding intra-coded frame within a time-window as having a large encoded-buffer size.

In decision block 430, subroutine 400 determines whether determined encoded-buffer-size delta exceeds a segment-end threshold (and other end-conditions satisfied). If so, then subroutine 400 proceeds to block 445. Otherwise, subroutine 400 proceeds to decision block 435.

In some embodiments, the segment-end threshold may be expressed as a percentage of the range between the largest and the smallest encoded-buffer size within the given encoded video. In the exemplary implementation described in Appendix A, the segment-end threshold is determined to be 8% of the encoded-buffer-size range within the encoded video.

In decision block 435, subroutine 400 determines whether the target intra-coded frame is the last intra-coded frame of the given encoded video.

In block 440, subroutine 400 target next intra-coded frame.

In block 445, subroutine 400 determines that one of a plurality of summarization segments ends at a timestamp associated with an encoded-buffer-size delta.

Subroutine 400 ends in ending block 499, returning to the caller.

Figure 5:
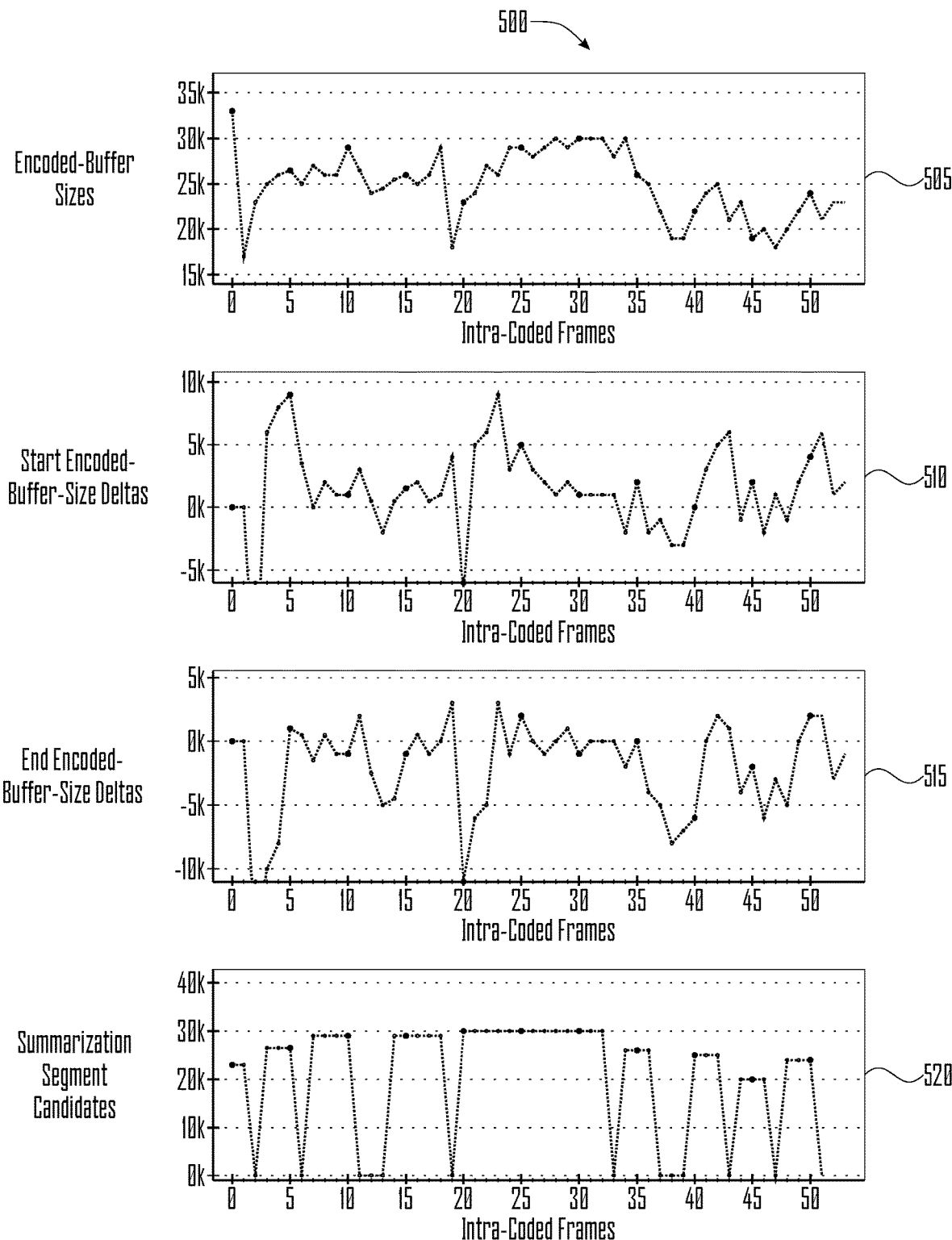
FIG. 5 illustrates several exemplary sets of data resulting from various operations such as described herein.

FIG. 5 illustrates several exemplary sets of data resulting from various operations such as described herein.

Encoded-buffer sizes graph 505 illustrates a signal derived from the encoded-buffer sizes of intra-coded frames within an exemplary encoded video.

Start encoded-buffer-size deltas graph 510 illustrates a signal derived from the encoded-buffer-size deltas of encoded-buffer sizes of intra-coded frames within an exemplary encoded video. More specifically, start encoded-buffer-size deltas graph 510 illustrates a signal derived from encoded-buffer-size deltas determined based on a preceding intra-coded frame within a time-window as having a small encoded-buffer size, such as may be employed when scanning for a start of a summarization segment.

End encoded-buffer-size deltas graph 515 illustrates a signal derived from the encoded-buffer-size deltas of encoded-buffer sizes of intra-coded frames within an exemplary encoded video. More specifically, end encoded-buffer-size deltas graph 515 illustrates a signal derived from encoded-buffer-size deltas determined based on a preceding intra-coded frame within a time-window as having a large encoded-buffer size, such as may be employed when scanning for an end of a summarization segment.

Summarization segment candidates graph 520 illustrates an exemplary set of evaluation values of summarization segments of an exemplary encoded video based on a simplified evaluation of the signals shown in start encoded-buffer-size deltas graph 510 and end encoded-buffer-size deltas graph 515.

Figure 6:
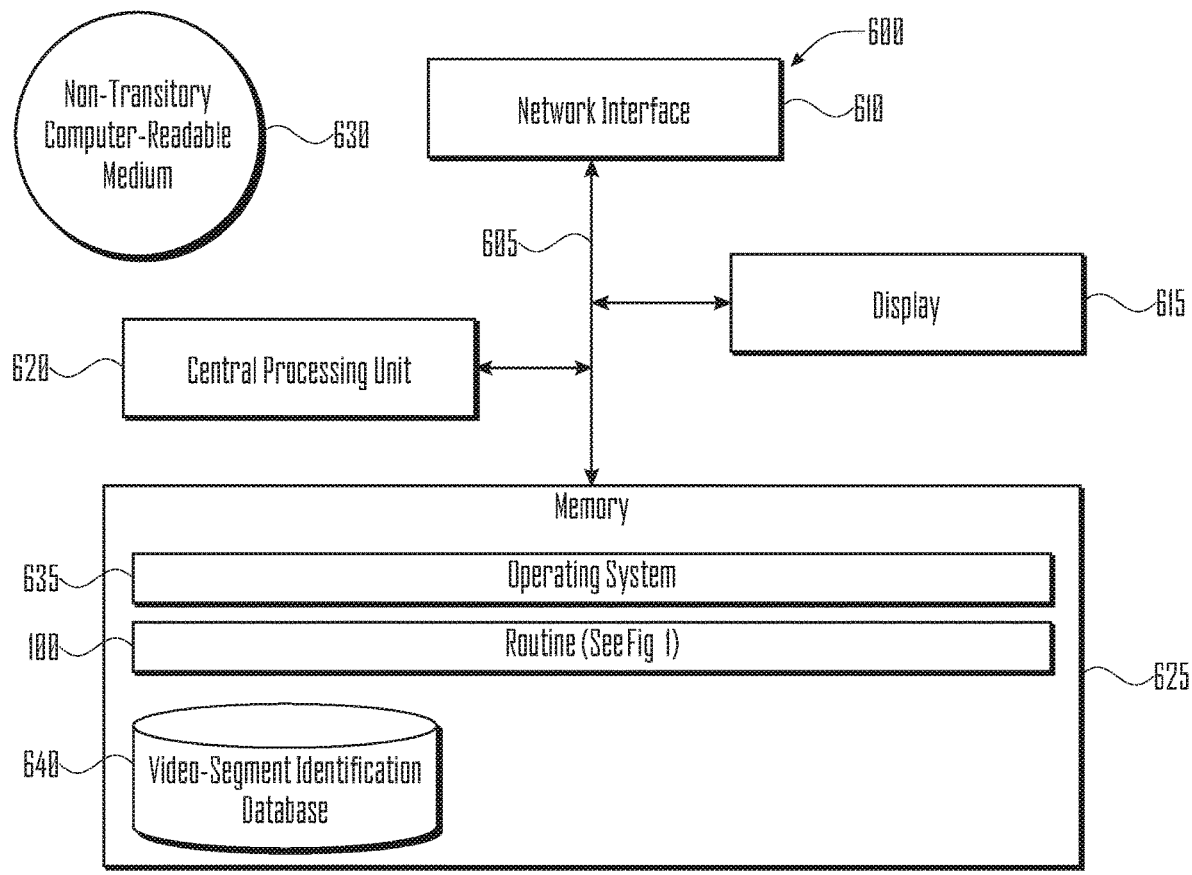
FIG. 6 illustrates several components of an exemplary video-segment identification device in accordance with one embodiment.

FIG. 6 illustrates several components of an exemplary video-segment identification device in accordance with one embodiment. In various embodiments, video-segment identification device 600 may include a desktop PC, server, workstation, mobile phone, laptop, tablet, set-top box, appliance, or other computing device that is capable of performing operations such as those described herein. In some embodiments, video-segment identification device 600 may include many more components than those shown in FIG. 6. However, it is not necessary that all of these generally conventional components be shown in order to disclose an illustrative embodiment.

In various embodiments, video-segment identification device 600 may comprise one or more physical and/or logical devices that collectively provide the functionalities described herein. In some embodiments, video-segment identification device 600 may comprise one or more replicated and/or distributed physical or logical devices.

In some embodiments, video-segment identification device 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Video-segment identification device 600 includes a bus 605 interconnecting several components including a network interface 610, a display 615, a central processing unit 620, and a memory 625.

Memory 625 generally comprises a random access memory ("RAM") and permanent non-transitory mass storage device, such as a hard disk drive or solid-state drive.

Memory 625 stores program code for a routine 100 for automatically generating a video presentation summarizing one or more encoded videos (see FIG. 1, discussed above). In addition, the memory 625 also stores an operating system 635.

These and other software components may be loaded into memory 625 of video-segment identification device 600 using a drive mechanism (not shown) associated with a non-transitory computer-readable medium 630, such as a floppy disc, tape, DVD/CD-ROM drive, memory card, or the like.

Memory 625 also includes video-segment identification database 640. In some embodiments, video-segment identification device 600 may communicate with video-segment identification database 640 via network interface 610, a storage area network ("SAN"), a high-speed serial bus, and/or via the other suitable communication technology.

In some embodiments, video-segment identification database 640 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Although specific embodiments have been illustrated and described herein, it will be appreciated by those of ordinary skill in the art that alternate and/or equivalent implementations may be substituted for the specific embodiments shown and described without departing from the scope of the present disclosure. For example, similar techniques may be applied to analyze signals other than the encoded-buffer sizes of intra-coded frames, such as the encoded-buffer sizes of inter-coded frames, the temporal location of subtitles in a video, and the like. This application is intended to cover any adaptations or variations of the embodiments discussed herein.

Following this description are Appendices A, which provide further information related to the subject matter disclosed herein.

More specifically, Appendix A includes pseudo-code illustrating one potential embodiment.

APPENDIX A

```
1
2  // Init global parameters
3  trigger_on = 0.08; // 8% - indicates change threshold when segment is
4  // turned ON from OFF state
5
6  trigger_off = 0.08; // 8% - indicates change threshold when segment is
7  // turned OFF from ON state
8
9  re_trigger_on = 0.2; // 20% - indicates change threshold when new segment
10 // is turned ON from ON state
11
12 Ascent_Wght = 0.75; // Indicate % of the ascent to the segment summit
13 // that will be attributed to the segment score
14
15 Descent_Wght = 0.33; // Indicate % of the descent from the segment summit
16 // that will be attributed to the segment score
17
18 Duration_Cap = 4.0; // Maximum duration of segment for which the segment
19 // score will be boosted
20
21 Duration_Weight_to_Range_ratio = 1.0 / 6.0; // Score ratio for duration
22 // (horizontal) vs. buffer size range (vertical) based scoring
23
24 Oscillation_tolerance = 0.0 // Maximum percent of range difference of
25 // rapid segment oscillation that will be ignore and have thus no impact
26 // of the state of the segment
27
28 Initial_Ascent_to_Range_ratio = 1.0 / 4.0; // Indicates portion of the
29 // buffer size range than will be used as ascent for the very first segment
30
31 trigger_on_time_window = 3.5; // Time window into the past that will
32 // be considered when establishing if segment is to be turned ON
33
34 trigger_off_time_window = 3.5; // Time window into the past that will
35 // be considered when establishing if segment is to be turned OFF
36
37 trigger_off_base_time_window = 3.5; // Time window into the future after
38 // segment descent detection that is used to compute segment segment base
39 // after descent and thus total amount of descent.
40
41 segment_start_oscillation_tolerance_keyframe_count = 2; // Maximum number
42 // of key-frames at the start of the segment after which buffer size
43 // oscillation can be ignored as attributed to segment start
44
45 segment_start_oscillation_tolerance_time_window = 3.5; // Maximum duration
46 // in seconds at the segment start during which buffer size oscillation can
47 // be ignored as attributed to segment start
48
```

```
49 segment_oscillation_tolerance_time_window = 3.5; // Maximum duration in
50 // seconds during the segment (not at start) for which buffer size
51 // oscillation can be ignored as attributed to brief mid-segment oscillation.
52
53 min_segment_duration_before_retrigger = 1.5;
54 retrigger_on_time_window = 3.5
55 Min_Segment_Duration = 2 seconds
56 Max_Segment_Duration = 5 seconds // Establish most significant video segments
57 // within each video in collection
58
59 For each video:
60 {
61 // Init per video parameters
62    Find min_buffer_size and max_buffer_size of keyframes within video
63        and compute range = max_buffer_size - min_buffer_size;
64    Ascent_init = range * Initial_Ascent_to_Range_ratio;
65    Duration_Wght = range * Duration_Weight_to_Range_ratio;
66    Segment_state = ON;   // Assume video starts with an segment
67    // Scan through key-frame sizes to establish segments
68
69    For each key-frame in video:
70    {
71        if (Segment_state == ON)
72        { // See if we need to turn this segment off (look for end of segment)
73
74           if (
75              // determine whether to store as segment
76              // up to the prior key-frame
77              (
78                 (
79                    max key-frame size of last trigger_off_time_window
80                    seconds of this segment - this key-frame size
81                 ) / range > trigger_off
82              ) && (
83                 (
84                    (
85                       this segment spans already at least
86                       segment_start_oscillation_tolerance_keyframe_count
87                       key-frames
88                    ) || (
89                       time difference between prior and next key-frame is
90                       more than
91                       segment_start_oscillation_tolerance_time_window
92                       seconds
93                    ) || (
94                       (
95                          (
96                             next key-frame size - min key-frame size of last
97                                trigger_on_time_window non-segment seconds
98                                before this segment and after prior segment
99                          ) / range
100                         ) <= trigger_on
```

```
101              )
102            ) && (
103              (
104                time difference between prior and next key-frame is more
105                than segment_oscillation_tolerance_time_window seconds
106              ) || (
107                abs(
108                  prior \ key-frame size - next key-frame size
109                ) / range >= Oscillation_tolerance
110              )
111            )
112          ) || (
113            (
114              duration of this segment is already greater than
115              min_segment_duration_before_retrigger
116            ) && (
117              (
118                next key-frame size - max key-frame size of last
119                retrigger_on_time_window seconds of this segment
120              ) / range > re_trigger_on
121            )
122          )
123        ) // end determine whether to store as segment
124        // up to the prior key-frame
125        {
126          Store as segment up to the prior key-frame:
127          if (this is first segment at start)
128          {
129            Segment_Ascent = Ascent_init;
130          }
131          Segment_start_time = time of first key-frame in the segment;
132          Segment_end_time =   time of last key-frame in the segment;
133          Segment_date =       video creation time + Segment_start_time;
134          Segment_duration =   Segment_end_time - Segment_start_time;
135          Segment_summit_size =
136            size of the largest key-frame of this segment;
137          Segment_summit_time =
138            time of the largest key-frame of this segment;
139          Segment_Ascent = (
140            Segment_summit_size - min key-frame size of last
141              trigger_on_time_window non-segment seconds before
142              this segment and after the prior segment
143          );
144          Segment_Descent = (
145            Segment_summit_size - min key-frame size of next
146              trigger_off_base_time_window seconds after this segment and
147              before next segment
148          );
149          Segment_score = (
150            Segment_summit_size +
151            Segment_Ascent * Ascent_Wght +
152            Segment_Descent * Descent_Wght +
```

```
153                min(Segment_duration, Duration_Cap) * Duration_Wght
154            );
155            Segment_normalized_score = Segment_score / max_buffer_size;
156            Segment_forced_duration = max(
157                min(Segment_duration, Max_Segment_Duration),
158                Min_Segment_Duration
159            );
160            Segment_forced_start_time = Segment_start_time;
161            Segment_forced_end_time = (
162                Segment_forced_start_time +
163                Segment_forced_duration
164            );
165            Segment_state = OFF;
166        }
167     } else { // segment state is off
168        // Look for start of segment
169        if (
170            (
171                this key-frame size - min key-frame size of last
172                    trigger_on_time_window seconds before this segment
173                    and after the prior segment
174            ) / range > trigger_on
175         )
176         {
177             Segment_state = ON;
178         }
179      }
180   } // end For each key-frame in video
181
182   Sort the segment list by Segment_score placing the highest score first
183   into Video_Segment_List
184
185 } // end for each video
186
187 // Compute duration of video to be created
188 Final_duration = min(1 min, (sum of all Segment_forced_durations));
189 // Select Segments to fill up Final_duration
190
191 For each Video_Segment_List:
192 {
193    Pick highest scoring segment (first segment in score sorted
194        Video_Segment_List) and place it into Final_Segment_List
195 }
196
197 while (
198     (
199        target duration is not exceeded in Final_Segment_List
200        (taking into account forced durations)
201     ) && (
202        there are segments left in any of the Video_Segment_Lists
203     )
204 )
```

```
205 {
206     Add to Final_Segment_List next segment with the highest
207         Segment_normalized_score across all Video_Segment_Lists (merge sort)
208 }
209
210 // Sort Final_Segment_List by Segment_date
211 // Merge or shorten évents
212 Segment_overlap_time = 1 second;
213 Min_Segment_Separation = 0.8 seconds + Segment_overlap_time;
214 Max_Combined_Segment_Duration = max(
215    2 * Min_Segment_Duration + Min_Segment_Separation,
216    Max_Segment_Duration
217 );
218 for each segment in Final_Segment_List
219 {
220    // Check if this and next segment do not meet
221    // Min_Segment_Separation requirement
222    If (
223       (
224          Segment_date +
225          Segment_forced_duration +
226          Min_Segment_Separation
227       ) > Next_Segment_date
228    )
229    {
230       // this and next segment do not meet
231       // Min_Segment_Separation requirement
232       // Check if we can merge two segments:
233       If (
234          (
235             Next_Segment_date +
236              Min_Segment_Duration -
237              Segment_date
238          ) <= Max_Combined_Segment_Duration
239       )
240       {
241          // Merge this and next Segments
242          Next_Segment_start_time = Segment_start_time
243          Next_Segment_end_time = Next_Segment_end_time;
244          Next_Segment_date = Segment_date;
245          Next_Segment_duration = (
246             Next_Segment_end_time -
247             Segment_start_time
248          );
249          Next_Segment_summit_size = max(
250             Segment_summit_size,
251             Next_Segment_summit_size
252          );
253          Next_Segment_summit_time = (
254             Segment_summit_size > Next_Segment_summit_size ?
255                Segment_summit_time : Next_Segment_summit_time
256          );
```

```
257          Next_Segment_Ascent = Segment_Ascent;
258          Next_Segment_Descent = Next_Segment_Descent
259          Next_Segment_score = max(
260             Segment_score,
261             Next_Segment_score
262          );
263          Next_Segment_normalized_score = max(
264             Segment_normalized_score,
265             Next_Segment_normalized_score
266          );
267          Next_Segment_forced_duration = min(
268             Next_Segment_duration,
269             Max_Combined_Segment_Duration
270          );
271          Next_Segment_forced_end_time = (
272             Next_Segment_start_time +
273             Next_Segment_forced_duration
274          );
275          Next_Segment_forced_start_time = Next_Segment_start_time
276          Remove current Segment from Final_Segment_List
277
278       } else {
279          // Cannot merge segments - check if we can shorten this segment
280          if (
281             (
282                Next_Segment_date - (Segment_date  + Min_Segment_Duration)
283             ) >=  Min_Segment_Separation
284          )
285          {
286             // Shorten this Segment
287             Segment_forced_duration = (
288                Next_Segment_date - Segment_date - Min_Segment_Separation
289             );
290             Segment_forced_end_time = (
291                Segment_start_time + Segment_forced_duration
292             );
293          } else {
294             // Could not shorten this segment enough
295             // If this segment is higher priority than next,  see if we
296             // can shorten next segment
297             if ( Segment_normalized_score >= Next_Segment_normalized_score)
298             {
299                // this segment is higher priority than next,
300                // see if we can shorten next segment
301                if (
302                   (
303                      Next_Segment_date +
304                      Next_Segment_duration -
305                      Segment_date -
306                      Min_Segment_Duration -
307                      Min_Segment_Separation
308                   ) >= Min_Segment_Duration
```

```
309                   )
310                   {
311                     // We can shorten next segment from the beginning
312                     // First shorten this segment to minimum
313                     Segment_forced_duration = Min_Segment_Duration
314                     Segment_forced_end_time = (
315                         Segment_start_time + Segment_forced_duration
316                     );
317                     // Now shorten next segment from its beginning
318
319                     Next_Segment_forced_start_time = (
320                         Segment_date +
321                         Min_Segment_Duration +
322                         Min_Segment_Separation
323                     );
324                     Next_Segment_forced_duration = (
325                         Next_Segment_end_time -
326                         Next_Segment_forced_start_time
327                     );
328                     Next_Segment_forced_duration = max(
329                         min(
330                             Next_Segment_forced_duration,
331                             Max_Segment_Duration
332                         ), Min_Segment_Duration
333                     );
334                     Next_Segment_forced_end_time = (
335                         Next_Segment_start_time +
336                         Next_Segment_forced_duration
337                     );
338
339                 } else {
340                     // Next segment cannot be shortened and it is lower
341                     // priority
342                     // Remove next segment
343                     Remove next Segment from Final_Segment_List
344                 }
345             } else {
346                 // This segment has lower score than next and we could not
347                 // shorten this segment
348                 // Remove this segment
349                 Remove current Segment from Final_Segment_List
350             }
351         }
352     }
353   }
354 }
355
356 // Insert transition overlap times to the segments in Final_Segment_List
357 for each segment in Final_Segment_List
358 {
359     if ( ! first segment )
360     {
```

```
361        Segment_forced_start_time -= Segment_overlap_time;
362    }
363
364    if ( ! last segment )
365    {
366        Segment_forced_end_time += Segment_overlap_time;
367    }
368
369    Segment_forced_duration = (
370        Segment_forced_end_time - Segment_forced_start_time
371    );
372 }
```

The invention claimed is:

1. A method, comprising:
   receiving a plurality of intra-coded frames of an encoded video;
   determining a start of a summarization segment for the encoded video as a first intra-coded frame of the plurality of intra-coded frames based on a first buffer-size delta between a first buffer size of the first intra-coded frame and a minimum buffer size of an intra-coded frame from a first set of the plurality of intra-coded frames exceeding a first threshold; and
   determining an end of the summarization segment as a second intra-coded frame of the plurality of intra-coded frames based on a second buffer-size delta between a second buffer size of the second intra-coded frame and a maximum buffer size of a second set of the plurality of intra-coded frames exceeding a second threshold.

2. The method of claim 1, further comprising:
   selecting the first set of the plurality of intra-coded frames from the plurality of intra-coded frames that precede the first intra-coded frame.

3. The method of claim 1, further comprising:
   selecting the first set of the plurality of intra-coded frames from the plurality of intra-coded frames that are within a time window that precedes the first intra-coded frame.

4. The method of claim 1, further comprising:
   selecting the second set of the plurality of intra-coded frames from the plurality of intra-coded frames that precede the second intra-coded frame.

5. The method of claim 1, further comprising:
   selecting the second set of the plurality of intra-coded frames from the plurality of intra-coded frames that are within a time window that precedes the second intra-coded frame.

6. The method of claim 1, wherein determining the start of the summarization segment for the encoded video as the first intra-coded frame comprises:
   determining that the first buffer-size delta exceeds a segment start threshold.

7. The method of claim 1, wherein determining the end of the summarization segment for the encoded video as the second intra-coded frame comprises:
   determining that the second buffer-size delta exceeds a segment end threshold.

8. The method of claim 1, further comprising:
   generating a video presentation of the encoded video that includes the summarization segment.

9. The method of claim 1, wherein determining the start of the summarization segment for the encoded video as the first intra-coded frame comprises:
   determining that a time duration between the first intra-coded frame and an end of a previous summarization segment exceeds a minimum duration.

10. The method of claim 1, wherein determining the end of the summarization segment for the encoded video as the second intra-coded frame comprises:
    determining that a time duration between the first intra-coded frame and the second intra-coded frame exceeds a minimum duration.

11. The method of claim 1, wherein determining the start of the summarization segment for the encoded video as the first intra-coded frame comprises:
    selecting the first intra-coded frame from the plurality of intra-coded frames;
    determining the first encoded-buffer size of the first intra-coded frame;
    determining a minimum buffer size of an intra-coded frame from the first set of the plurality of intra-coded frames;
    determining the first buffer-size delta between the first encoded-buffer size and the minimum buffer size; and
    identifying the first intra-coded frame as a start frame of the summarization segment in response to the first buffer-size delta exceeding a segment start threshold.

12. The method of claim 1, wherein determining the end of the summarization segment for the encoded video as the second intra-coded frame comprises:
    selecting the second intra-coded frame from the plurality of intra-coded frames;
    determining the second encoded-buffer size of the second intra-coded frame;
    determining a maximum buffer size of an intra-coded frame from the second set of the plurality of intra-coded frames;
    determining the second buffer-size delta between the second encoded-buffer size and the maximum buffer size; and
    identifying the second intra-coded frame as an end frame of the summarization segment in response to the second buffer-size delta exceeding a segment end threshold.

13. A non-transitory computer-readable storage medium having stored thereon instructions that when executed by a processor, cause the processor to perform actions, the actions comprising:
    receiving a plurality of intra-coded frames of an encoded video;
    selecting a first intra-coded frame from the plurality of intra-coded frames;
    determining a first encoded-buffer size of the first intra-coded frame;
    determining a minimum buffer size of an intra-coded frame from a first set of the plurality of intra-coded frames;
    determining a first delta between the first encoded-buffer size and the minimum buffer size;
    identifying the first intra-coded frame as a start frame of a summarization segment for the plurality of intra-coded frames in response to the first delta exceeding a first threshold;
    selecting a second intra-coded frame from the plurality of intra-coded frames;
    determining a second encoded-buffer size of the second intra-coded frame;
    determining a maximum buffer size of an intra-coded frame from a second set of the plurality of intra-coded frames;
    determining a second delta between the second encoded-buffer size and the maximum buffer size; and
    identifying the second intra-coded frame as an end frame of the summarization segment in response to the second delta exceeding a second threshold.

14. The non-transitory computer-readable storage medium of claim 13, wherein the instructions that, when executed by the processor, cause the processor to perform further actions, the further actions comprising:
    selecting the first set of the plurality of intra-coded frames as intra-coded frames from the plurality of intra-coded frames that precede the first intra-coded frame; and
    selecting the second set of the plurality of intra-coded frames as intra-coded frames from the plurality of intra-coded frames that precede the second intra-coded frame.

15. The non-transitory computer-readable storage medium of claim 13, wherein the instructions that, when executed by the processor, cause the processor to perform further actions, the further actions comprising:
- selecting the first set of the plurality of intra-coded frames from the plurality of intra-coded frames that are within a first time window that precedes the first intra-coded frame; and
- selecting the second set of the plurality of intra-coded frames from the plurality of intra-coded frames that are within a second time window that precedes the second intra-coded frame.

16. The non-transitory computer-readable storage medium of claim 13, wherein identifying the first intra-coded frame as the start frame of the summarization segment comprises:
- determining that a time duration between the first intra-coded frame and an end of a previous summarization segment exceeds a minimum duration.

17. The non-transitory computer-readable storage medium of claim 13, wherein identifying the second intra-coded frame as the end frame of the summarization segment comprises:
- determining that a time duration between the first intra-coded frame and the second intra-coded frame exceeds a minimum duration.

18. The non-transitory computer-readable storage medium of claim 13, wherein the instructions that, when executed by the processor, cause the processor to perform further actions, the further actions comprising:
- generating a video presentation of the encoded video that includes the summarization segment.

19. A computer, comprising:
- a non-transitory memory that stores computer instructions; and
- a processor communicatively coupled to the non-transitory memory that, in operation, executes the computer instructions to cause the processor to:
  - obtain a plurality of intra-coded frames of an encoded video;
  - select a first intra-coded frame from the plurality of intra-coded frames as a start frame of a summarization segment for the encoded video; and
  - for each respective intra-coded frame of the plurality of intra-coded frames after the first intra-coded frame:
    - determine a delta between an encoded-buffer size of the respective intra-coded frame and a maximum buffer size of an intra-coded frame from a set of the plurality of intra-coded frames that precede the respective intra-coded frame; and
    - identify the respective intra-coded frame as an end frame of the summarization segment in response to the delta exceeding a segment end threshold.

20. The computer of claim 19, wherein the processor selects the first intra-coded frame as the start of the summarization segment by executing the computer instructions to further cause the processor to:
- determine a second delta between an encoded-buffer size of the first intra-coded frame and a minimum buffer size of an intra-coded frame from a set of the plurality of intra-coded frames that precede the first intra-coded frame; and
- identify the first intra-coded frame as the start frame of the summarization segment in response to the second delta exceeding a segment start threshold.

* * * * *